United States Patent [19]

Smith et al.

[11] 3,813,058

[45] May 28, 1974

[54] CONVEYOR SYSTEM

[75] Inventors: Robert William George Smith, Gosport; David Michael Arthur Barron, Portsmouth; Arthur George Wingrove, Newbury, all of England

[73] Assignee: Dialled Despatches Limited, Lee-on-Solent, Hampshire, England

[22] Filed: July 10, 1972

[21] Appl. No.: 270,457

Related U.S. Application Data

[63] Continuation-in-part of Ser. No. 89,587, Nov. 16, 1970, abandoned.

[30] Foreign Application Priority Data

Nov. 18, 1969 Great Britain.................... 56417/69

[52] U.S. Cl............................................... 243/16 R
[51] Int. Cl............................................. B65g 51/46
[58] Field of Search................................ 243/16–19, 243/30, 36, 38, 29

[56] References Cited
UNITED STATES PATENTS

| | | | |
|---|---|---|---|
| 2,710,728 | 6/1955 | Halpern............................ | 243/30 X |
| 3,227,396 | 1/1966 | Joy...................................... | 243/16 R |
| 3,333,787 | 8/1967 | Voitas et al........................ | 243/16 R |
| 3,361,384 | 1/1968 | Thorburn............................ | 243/16 |
| 3,417,941 | 12/1968 | Stieber............................... | 243/16 R |

FOREIGN PATENTS OR APPLICATIONS

990,318   4/1965   Great Britain........................ 243/19

*Primary Examiner*—Evon C. Blunk
*Assistant Examiner*—W. Scott Carson
*Attorney, Agent, or Firm*—Toren, McGeady and Stanger

[57] ABSTRACT

A conveyor system including a pneumatic main ring having a number of branch loops accommodating a number of receiver/dispatch stations respectively, diverter means for diverting a carrier into each loop, sensing means or zone switches dividing the main tube into zones, a control unit having a memory for each zone ($Z_n$) and arranged to receive the address signal from the memory of the preceding zone ($Z_{n-1}$) to control the passage of the carriers around the ring, the sensing means or zone switches being arranged to sense the passage of a carrier from each zone to the next zone and arranged to move the address signal from the memory of the first zone into the memory of the second zone and there is a switch located in the main ring upstream from and associated with the diverter means, this switch being controlled by the control unit so that it is in an operable condition only when the memory of the zone in which it is located contains the address signal of a station in the loop controlled by the associated diverter means, this switch being capable, in its operable condition, of sensing the passage of the carrier and operating the associated diverter means to divert the carrier to its destination station.

11 Claims, 4 Drawing Figures

CONVEYOR SYSTEM

This is a continuation-in-part of Application Ser. No. 89,587 filed on Nov. 16, 1970 now abandoned.

This invention relates to a pneumatic conveyor system for e.g., carriers travelling in prescribed paths, for example, a pneumatic tube conveyor system for transporting carriers for carrying documents or components and other articles. In a known conveyor system, there are pairs of pipes for extending between a central exchange and each destination, these two pipes being for sending and receiving the carriers respectively. The carriers are physically routed at the exchange, for example by electro-mechanical relays. But this system is limited to a low load since it does not deal with simultaneous multi-traffic in each pipe and all carriers pass through the central exchange and the speed of operation of the central exchange is limited so severely limiting the maximum load of the whole system.

The invention includes a pneumatic conveyor system including a main tube line in the form of a ring having one or more branches, each branch accommodating a receiving and/or dispatch station means for supplying a transport medium along the main tube line, the main tube line also having a diverter means associated with each branch capable of diverting a carrier into the branch, a number of sensing means or zone switches dividing the main ring tube into zones, each zone switch being adapted to sense the passage of a carrier into its zone, a control unit comprising a zone memory for each zone arranged to receive an address signal of a carrier from the memory of the preceding zone and arranged to pass this address signal into the zone memory of the succeeding zone or to sanction operation of the diverter means in its zone, the sensing means or zone switches being connected to control the passage of the address signal from one zone memory of the succeeding zone memory.

An example is shown in the accompanying drawings in which.

Figure 1:
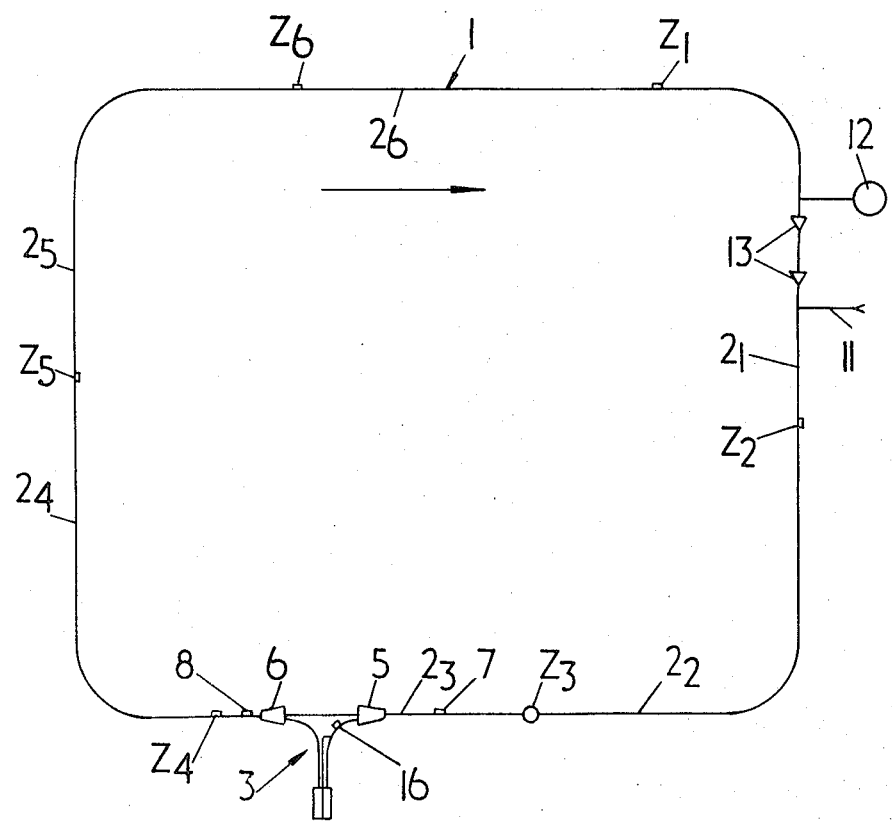
FIG. 1 shows a simplified diagram of the systems.
Figure 2A:
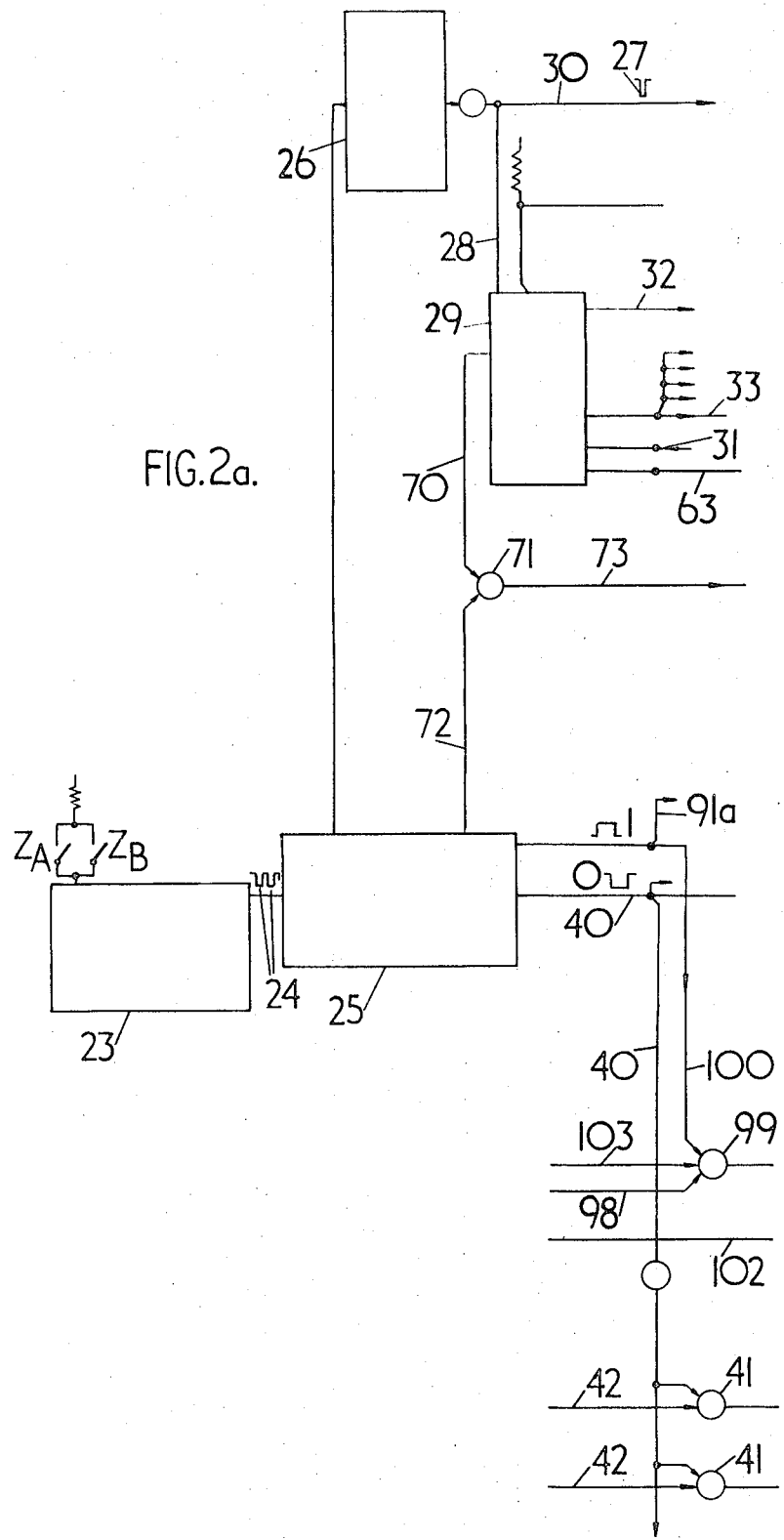
FIGS. 2a, 2b and 2c are different parts of the control and station circuits.
Figure 2B:
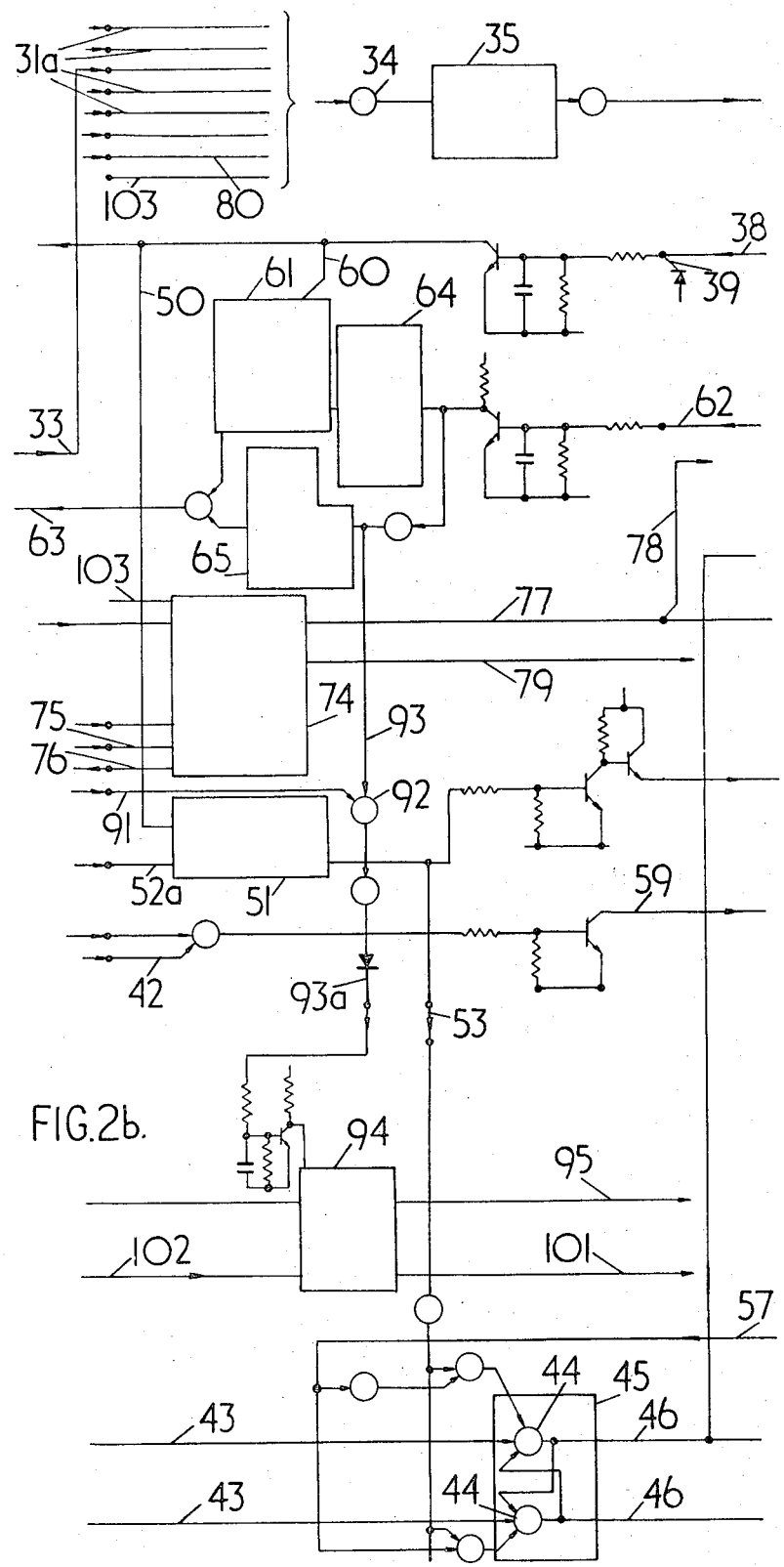
Figure 2C:
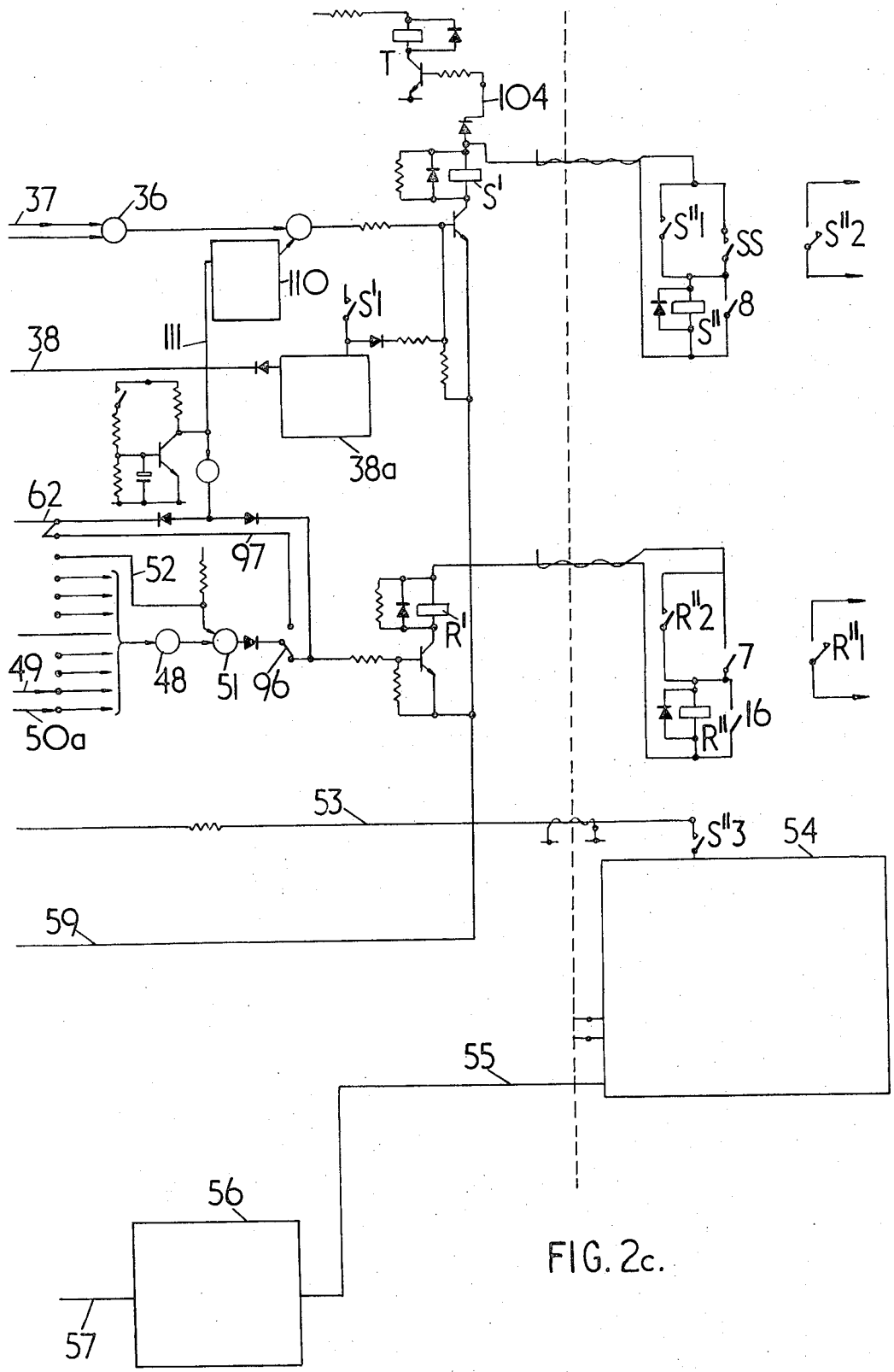

In FIG. 1 there is shown the mechanical part of the system incorporating a continuous single ring main tube 1 installed in a building to connect the various locations that require an air tube conveyor station and this mechanical part is a ring main system.

A centralised control unit is provided to control and route the carriers around the ring main tube 1.

The tube 1 is divided into a number of approximately equal zones 2 each having a minimum length 100 ft. and a zone sensing switch Z is situated at the commencement of each zone 2. For production reasons, we find a normal maximum of 16 zones is suitable but we can provide a tube 1 with a greater or smaller number of zones 2 if desired. Zone sensing switches Z are of the magnetic reed type and are operated by a small ring magnet concealed in the carrier and known per se. Around this tube 1 there are several stations 3 each station having a first diverter 5 and a second diverter 6, a first local station switch 7, a second local station switch 8 and a Send-Receive Terminal and these stations are positioned as required around the tube route with a master station where the control unit is sited. Each station also has a selector unit which contains a "Carrier receive" lamp and buzzer for informing the operator at the station that the carrier is received and two thumbwheel destination switches for selecting the required address code for a carrier to be sent or dispatched. Compressed air is supplied through air intake 11 into tube 1 and exhausted by exhauster 12 separated from intake 11 by two air locks 13. The carriers drop through this distance by gravity.

The operation in simple terms is as follows.

The operator dials the required address code of the address station, say station N on the two address switches which convert the decimal number of station N into a binary code signal $A_3$. The operator also inserts the carrier in the dispatch station. When the exhausters have started up and the air flow is normal the diverters will operate and at the same time the address code will be transferred to an address memory for this zone. This address memory is connected in line to the address memories of the preceding and succeeding zones so that the address memories of all the zones are connected to form a ring. If the system is already in use the carrier will be held in the dispatch station until there are two unoccupied zones on either side of the zone containing the operator's dispatch station so that the carriers are at least spaced apart by the correct minimum traffic distance.

When the carrier is sent from zone say $2_4$ containing the operator's dispatch station and passes the zone switch $Z_5$ then the address signal $A_3$ will pass from the address memory of zone $2_4$ to the address memory of zone $2_5$. This signal $A_3$ is then compared with the address signal of any station in zone $2_5$ and then, if $A_3$ does not not match any such signal, the signal $A_3$ is transferred to the address memory of zone $2_6$ as the carrier passes zone switch $Z_6$. This process continues until signal $A_3$ arrives in the address memory of a zone which contains station 3 namely zone $2_3$ then signal $A_3$ enters the address memory of zone $2_3$ and registers the address signal of station 3. The carrier, then passes switch 7 which, because $A_3$ has registered, operates both diverters 5 and 6 so that the air flow and carrier are diverted into the station branch. When the carrier passes a receive switch 16 on the entry branch pipe of station 3 the diverters 5 and 6 are returned to their undiverted or normal positions and the zone $2_3$ of the main tube 1 returns to its "Unoccupied" normal state. In other words, as the carrier travels around the ring it operates the zone switches Z and this simultaneously transfers the carrier's address signal along the line of address memories. On entering the zone of the address station the address signal is recognized by the station and on passing a diverter switch the diverters will operate and the carrier will be received but also the zone inhibit memory will then be reset, unless a carrier was waiting to leave, in which case it will stay inhibited until this carrier reaches the zone switch of the second succeeding zone along the main ring. In detail, we refer to the other drawings, the station circuit is on the right hand side of the dotted lines and the corresponding part of the control unit for controlling the zone containing the station is on the left side. Two reed switches $Z_A$ and $Z_B$ are connected in parallel along the axis of the ring main tube. The carriers each carry a small magnet concealed in the carrier so that as the carrier passes the two reed switches $Z_A$ and $Z_B$ two input pulses 24 pass through a filter interface unit 23 which changes the voltage from 24 to 5 volts passed into a monostable unit 25 to trigger the monostable. The monostable produces complementary pulses 0 and 1. Circuit 26 used the trailing edge of pulse 1 to generate a short pulse 27 which is used to set zone inhibit memory 29 whose main purpose is to inhibit dispatch of a carrier from the station in its zone. Pulse 27 also passes along line 30 to reset the zone inhibit memory of the previous zone. Line 31 resets the zone inhibit memory 29 from the succeeding zone control circuit in similar manner.

The 0 pulse output from monostable 25 passes along line 40 to sanction gates 41 so that when the carry address signal occurs at gates 41, these gates 41 pass the address information on lines 42 from the preceding zone along lines 43 to the zone address memory 44 formed by latches 45. Only one address circuit is shown but there are six lines using the six line binary code which gives 64 different addresses. When the signal is removed the latches 45 will retain the address signal brought forward from the address memory of the previous zone. As the carrier travels around the ring main the address signal will pass to the next zone along lines 46. The address signal on the six lines, will also pass along six branch lines, to the station receive gate 48. Lines 49 and 50 connect receive gate 48 with a too close memory for this zone and the preceding zone which will be described later and which supply to gate 48 inhibit signals if there is another carrier which is too close to the present carrier. If the six address lines have the correct address and if there is no too close inhibit signals from lines 49 and 50 then receive gate 48 sanctions gate 51, or alternatively line 52 supplies sanction from a multi-address board to give sanction to receive to the station receive circuit. With this sanction, as a carrier passes incoming switch 7 upstream of the diverter, receive relays R' and R'' are called.

In the control circuit, contact R' forms part of a series circuit to hold both relays. At the station, contact R''2 forms part of a series circuit to hold both milli R' and R'' and contact R''1 sends a signal to open the station diverters 5 and 6 to receive the incoming carrier. The diverters remain open until the incoming carrier passes the receive switch 16 whereupon the contact 16 short circuits the coil of the R'' relay and releases it, the holding circuit for both relays is broken and the diverters 5 and 6 close. For sanctioning the other operation at a station, namely carrier dispatching, the absence of a signal from the inhibit memory 29 along line 33 through send gate 34, a 1 milli second time delay unit 35 to station control gate 36 sanctions dispatch. This is assuming the inhibit memories of the two zones on either side are not inhibited. If a priority input pulse is received along line 37 from a scanner then sanction to dispatch passes to relay S'. When a carrier for dispatch is inserted into the station, switch SS is closed and send relays S' and S'' are called. Lines 31a are from the inhibit dispatch memories of the preceding and succeeding two zones. At the control unit contact S''-1 forms part of a series circuit to hold both relays energized and contact S'-1 sends a carrier dispatched signal along line 38 to set the inhibit dispatch memory 29 to prevent the stations in the adjacent zones in each direction from dispatching carriers.

Line 32 illuminates a lamp when a carrier has been dispatch and is in the zone and therefore the zone is occupied. Line 39 supplies a signal from the too close memory of the preceding zone and will be described later.

At the station contact S''1 forms part of a series circuit to hold both relays energized and contact S''2 open the station diverters 5 and 6 to direct the stream of air out of the main ring through the station and back to the main ring and thereby dispatch the carrier.

Relay S'' also closed contact S''3 so that a station zone sanction address signal passes along line 38 in the form of a 1 second pulse formed by unit 38a along line 50, through a full scan pulse interlock unit 51 when this unit receives sanction for this zone along line 52a from a scanner. The station address signal arrives at the station address selector switch 54 which has six common address lines which interconnect all of the stations and connects with the control unit. A six line binary code gives up to 64 different addresses. The address is dialled by the operator in decimal form and converted by the thumb-wheel switch into a binary form. Since this is a three-bit B.C.D. code only eight digits can be used and therefore the station addresses start at 11 and continue to 88 omitting any numbers with 0 or 9. When contact S''3 closes the address selected in switch 54 passes along six address lines 55, only one shown for convenience, through interface unit 56 which reduces the voltage from 24 to 5, and into the address memory 45 provided sanction has been received from line 53 via line 57. This address will pass out to the next zone along the six pairs of lines 46 (only one pair is shown for convenience). The diverters remain open until the dispatched carrier passes the outgoing switch 8 whereupon this contact short circuits the coil of the S'' relay causing it to release, the holding circuit for both relays S' and S'' is broken, contact S''2 open and the diverters 5 and 6 close. Line 59 passes a 0 pulse to reset both receive and send relays R and S of the control unit as the carrier passes the zone switches $Z_A$ and $Z_B$ and enters the zone and also as the carrier passes the zone switch of the succeeding zone, i.e., in leaving the zone. Thus relays R and S are confirmed reset prior to the carrier reaching and operating incoming switch 7. Line 42 also resets relays R and S when carrier passes zone switch of succeeding zone, useful if diverters have not closed on operation of switch 8 on sending.

When the carrier is dispatched, a dispatched signal passes from line 38 along line 60 to set a carrier dispatched memory 61 which will then inhibit the carrier received signal on line 62 from resetting the zone inhibit dispatch memory 29 along line 63 so that as a carrier is received another carrier can be dispatched. Units 64 and 65 divide this signal into a leading edge pulse and trailing edge pulse respectively and the trailing edge pulse is inhibited by the carrier dispatched memory if set. The carrier dispatched memory is reset from the leading edge pulse from 64.

The output of the zone inhibit memory 29 is fed along line 70 into a two input 'and' gate 71 in conjunction with the monostable pulse 1 alone line 72 from the monostable unit 25 so that if a second carrier enters the zone before the zone inhibit dispatch memory 29 has been reset by the initial carrier leaving the zone, it will cause the 'and' gate 71 to send a too close signal along the line 73 to set a zone too close memory 74 giving this second a too close logic indication. Coincidence of pulse and zone memory sets the carrier "too close" memory. Line 76 resets the too close memory of the preceding zone after the too close memory 74 has been set. Line 77 sends a too close signal to receive gate 48 to inhibit either carrier being received. Line 78 sends a signal to inhibit the receive gate of the preceding zone and this line 78 corresponds to line 50a. Line 76 also inhibits dispatch if a too close condition exists in the third succeeding zone. Line 79 carries a signal from the zone too close memory 74 to the carrier dispatch line 38 of the next zone and corresponds to line 39 setting the inhibit memory of the next zone. This allows line 72 of next zone to operate gate 71 since a set is on line 70 and thus line 73 sets the next too close memory i.e., the too close memory of the next zone as the leading carrier enters the zone.

Detection of a "too close" condition occurs when two carriers occupy the same zone and once this condition has been set up the leading carrier causes the "too close reject" signal to be transferred from zone to zone until the leading carrier is rejected at one of the stations which has rejected facilities and this is referred to as the reject station.

If for some reason a carrier is not diverted into its address station for example if there is a fault in the diverter supply but the address was recognised by receive gate 48 then the carrier will proceed past the zone switch of the succeeding zone which will send a pulse along line 91 to gate 92. If a carrier received signal is still present on line 93 coming from line 62 due to relay R' not having been de-energized then reject 94 is set and this signal will pass along line 95 round ring of similar reject memories to a reject station to be described later. 96 is a manual switch to switch out the receiving function of the station, for example if the station is not being used. The address signal is thus switched to line 97 which is linked to line 62. There is a permanent signal on line 62 while the address is present and this signal will stay until a different address arrives and will not leave with the carrier and thus will stay on line 93. Line 91 sends a pulse when any carrier enters the succeeding zone by passing the zone sensing switch of the succeeding zone. Line 98 supplies a reject signal from the reject memory of the preceding zone to reject memory gate 99 which will pass into reject memory 94 when the carrier to be rejected passes the zone switches $Z_A$ and $Z_B$ to send an 1 pulse along line 100. The pulse on line 91 allows a signal down line 93a to reject memory 94 to trigger its reject signal along line 95 to the next reject memory of the succeeding zone as the carrier enters that succeeding zone. Line 91a supplies a pulse to the line corresponding to line 91 of the preceding zone. Line 101 sends a reset signal from the reject memory 94 to the reject memory of the preceding zone and line 102 sends a similar signal to the reject memory 94 from the succeeding reject memory zone when it has been set by the reject signal along line 95.

When a carrier is despatched, its address has to be inserted into the zone address memory 45.

Because common lines are used to convey address information from each station to the control unit, stations cannot transmit addresses simultaneously. A scanning system is therefore used to allow address information to be sent over the common lines in a sequential manner. The scanner consists of a pulse shaper which supplied 50 Hz., mains derived, pulse to four binary stages in cascade giving a counting scale of 16.

The 16 count states are recognised by sixteen four input 'and' gates. Each gate output sanctions address insertion for a particular zone in conjunction with carrier dispatch into the zone.

When a carrier is to be dispatched from a station, and a carrier is not being simultaneously received, the carrier dispatch is subject not only to two clear zones ahead and two clear zones behind the transmitting zone but dispatch is also subject to the air supply being correct, given by a signal on line 80 to send gate 34, and a priority system if more than one station in the same zone is waiting to dispatch, given by line 37 to gate 36. A zone sanction for imparting an address signal from selector switch 54 to zone address memory 45 is given by line 52 and unit 51. The air intake has a control sensing means to sense when air flow drops below a predetermined minimum. Lines 103 are spare. Line 104 sets the timer reject relay T. Line 111 is operated by receive relay to sanction dispatch or another carrier if there is one waiting at the station simultaneously with the carrier being received. The carrier would go anyway but it would be unreceived by the system, i.e., its address signal would not be received into the zone address memory.

Signalling from the control unit to a station and return signalling from a station is carried out by the sympathetic action of two relays in series, namely R' and R" and S' and S" for the receive and send operations respectively. Twisted pair interconnections are used between the relays at the central control and the station and by supplying the operating current from the central control unit the "go and return" currents are effectively balanced thus ensuring negligible electrical interaction with adjacent circuits. By the use of balanced pair working, together with reed relays for information reception, high rejection of electrical interference and extremely good reliability is ensured. Where information in and out of the central control unit is not transmitted by the dual relay system an interface is used whose purpose is to allow the use of higher voltage levels (24v) on signal lines external to the central processor. This again is a precaution to minimise the possibility of signal error by electrical interference. The interface transposes the higher voltage level (24v) of the zone and address switch signals to that of the low voltage level (5v) used by the intergrated circuits in the computer.

One station is a reject station in which line 52 is arranged to receive signals from the the too close memory or the reject memory of its zone and over-rides the address gate 48 to ensure that, upon operation of the incoming switch 7 of the reject station by the carrier to be rejected, relays R' and R" operate regardless of the address signal prevented to gate 48 and thus diverters 5 and 6 operate to divert the carrier.

When two or more stations are in a zone, a priority system is necessary to prevent stations simultaneously dispatching carriers. Priority is established by sanctioning dispatch from each station in turn, the first station to receive sanction and dispatch a carrier sets the zone inhibit dispatch memory 29 preventing dispatch by other stations in the zone. The zone scanning circuits are used for priority scanning to avoid duplication of circuits. When allocating station address within a zone it is necessary to allocate the station requiring the first dispatch priority with the least significant scan output.

If a carrier circulates in the ring and is not received at a station due to misdirection by an operator it is removed by allowing the reject station "timed reject" function to be set in operation by the circulating carrier entering the reject station zone. It is then rejected in a similar manner to the leading carrier of a "too close" pair except that the zone "inhibit dispatch" memory is reset when the carrier is received.

This special circulating reject function is initiated by two timers operating in parallel. Both timers are reset by timer reset relay T when a carrier is loaded into any dispatch compartment and signal SS is present. the first timer has a period sufficient to adequately cover two complete circulations of the ring and when this period has elapsed the reject station timed reject logic is operated when the circulating carrier passes the reject station incoming zone switch. The second timer controls the air exhauster allowing it to run for sufficient time after the first timer's shorter period to enable the circulating carrier to make at least a complete circumference of the ring before it is rejected.

In a busy system the short time period would seldom elapse due to frequent introduction of carriers into the ring. A further method may be used whereby the address of every carrier is checked electronically as it enters the reject station zone. If an address is invalid or corrupted the carrier would be rejected by the reject logic as in section 8.

Many advantages accrue to this system because of its use of a centralised control. Extra information such as the location of various carriers by lights and for the address of each carrier can easily be arranged to be given on a mimic panel associated with the computer. This mimic panel could also be arranged to indicate when the system is fully occupied and a carrier is waiting to enter.

it is possible for one station to lead to other ring circuit containing further stations and this interconnecting station could automatically store carriers destined for the other circuits.

Thus a comprehensive control system and reject station is provided which enables rejection of carriers due to the following faults:
a. carrier routed to an address not on system will be rejected as soon as it passes the reject station.
b. carrier unable to home because station has been switched out at central control (for maintenance or a station not occupied). Carrier will pass its destination once and then reject.
c. carrier unable to home because of diverter or local mains failure (or switch Off). Carrier will pass station once and then reject.
d. Carrier gets 'too close' to another carrier i.e., enters the same zone. This means that both carriers will have the same address (that of the rear carrier). In this case the carriers will pass the destination address and will be rejected at the reject station.
e. to cover any fault not dealt with above there is also timed rejection which rejects any carrier that is still in the system after a period of non use.
f. there is also a manual reject switch (clear system) fitted to the central unit which when operated prevents sending from all stations and rejects all carriers passing the reject station.

Rejection mode (c) occurs when a carrier leaves a zone in which its address was recognized but it was not received at a station, it is registered in the "zone reject" memory 94 which is set when the carrier passes the zone switch on leaving a zone, subject to the condition that a "receive" relay is still latched up within the zone.

This reject information is transferred from one "zone reject" memory to the next as the carrier travels from zone to zone until the zone containing the reject station is reached when the condition is sensed and the carrier rejected. The address of the carrier to be rejected is dispalayed in decimal form as it enters the reject station zone. The display is held until another reject occurs or until a manual "reject display" button is pressed.

Rejection mode (b) is similar to (c) above except that the "zone reject" memory is set immediately a "switched-off," or inhibited, station address is recognized. The inhibit is switched in by a manually operated toggle switch mounted on individual station boards in the control unit. The position of the switch levers provide indication of which stations are "switched-off" to an operator at the control unit.

This form of operation could be dispensed with if station personel "switch-off" their station by a local switch and informed the control unit operator who would record the fact on a form of display. Alternatively, subject to wiring costs, the local "station-off" switch could have an extra pole to operate a remote display at the reject station. If a station shuts down by its own local control, reject by Mode (c) operates.

A red warning lamp is fitted on the control unit display panel and reset button which is illuminated for all reject carriers, and an address display which indicates the address of all rejected carriers except the 'too close' mode when the address would be irrelevant. It is also possible (for maintenance checks) to read the address of any carrier passing through the zone (in which the reject station is sited) by the "read address" switch. A fault lamp is also fitted which is controlled by an air flow switch located at the air intake and gives warning of any interruption of the air flow, it also inhibits sending from any station until fault is cleared.

The internal circuits of the central control unit are virtually all solid state i.e., integrated circuits, transistors, diodes etc., working at 5 volts D.C. and mounted on plug-in printed circuit boards. The circuits that actually control the stations (via the interconnecting cables) work at 24 volts D.C. This 24 volt D.C. enables telephone cables to be used for all control circuits and local station wiring except the diverters, and the send-/receive terminal door lock and check solenoids (not described).

The send/receive terminal contains an air by-pass so that, in the receive housing, there is dead air and not a strong stream of air.

There can be several personal indicators for different persons who all collect carriers from one receive terminal which is then a multiple station and each personal indicator is operated as a separate station.

Also, if desired, a single station could be arranged to cascade into several further stations.

It will be appreciated that all these various features can be varied or omitted as required by the customer.

Our system has the advantages that there can be simultaneous multi-operation of carriers and there can be a positioning display of the total situation in the system due to having the central control unit.

The mechanical details of diverter units are well known.

What we claim is:
1. A pneumatic conveyor system for dispatching a carrier from one to another of a plurality of stations, comprising a main tube line in the form of a ring, a branch extending from said ring, said branch including one of the stations, means for supplying a transport medium along the main tube line, said main tube line also having diverter means associated with each branch capable of diverting a carrier into the branch, a plurality of sensing means dividing the main ring tube into zones for sensing the passage of a carrier into the respective zone, a control unit including a zone memory for each zone, each zone including one of the stations, said memories being coupled and having means for receiving an address signal of a station to which a carrier is dispatched from the memory of the preceding zone and for selectively passing the address signal into the zone memory of the succeeding zone and sanctioning operation of the diverter means in its zone on the basis of the address signal, the sensing means being connected to control the passage of the address signal from one zone memory to the succeeding zone memory.

2. A system as claimed in claim 1 wherein the diverter means includes an incoming switch located in the main ring upstream in the travel direction of a carrier from a carrier diverter means, said diverter means being located at the junction of a branch with the main ring, said incoming switch being arranged so that it is in an operable condition only when the memory of the zone in which it is located contains the address signal of the said station in the branch controlled by the said diverter means, said switch being capable of sensing the passage of the carrier and operating the associated carrier diverter means to divert the carrier to its receiving station.

3. A system as in claim 2, further comprising means for imparting an address signal to a zone memory when a carrier is to be dispatched from a station in that zone.

4. A system as in claim 2, wherein each branch has a receive switch located between the carrier diverter member and the station to which the carrier is dispatched, said receive switch being adapted to sense the passage of the carrier and return the carrier diverter member to its non-diverting condition.

5. A system as in claim 4, further comprising means for imparting an address signal to a zone memory when a carrier is to be dispatched from a station in that zone.

6. A system as in claim 5, wherein each of said zone memories includes means responsive to others of said zone memories for enabling receipt of address signal only when the zone memories of a predetermined number of previous and subsequent zones in the direction of carrier travel are clear.

7. A system as claimed in claim 1 wherein each branch has a receive switch located between the carrier diverter member and the station to which the carrier is dispatched, said receive switch being adapted to sense the passage of the carrier and return the carrier diverter member to its non-diverting condition.

8. A system as in claim 7, further comprising means for imparting an address signal to a zone memory when a carrier is to be dispatched from a station in that zone.

9. A system as in claim 8, wherein each of said zone memories includes means responsive to others of said zone memories for enabling receipt of address signal only when the zone memories of a predetermined number of previous and subsequent zones in the direction of carrier travel are clear.

10. A system as claimed in claim 1, further comprising means for imparting an address signal to a zone memory when a carrier is to be dispatched from a station in that zone.

11. A system as in claim 10, wherein each of said zone memories includes means responsive to others of said zone memories for enabling receipt of address signal only when the zone memories of a predetermined number of previous and subsequent zones in the direction of carrier travel are clear.

* * * * *